US007702593B2

(12) United States Patent
Pintsov

(10) Patent No.: US 7,702,593 B2
(45) Date of Patent: Apr. 20, 2010

(54) SYSTEM AND METHOD FOR PRINTING CORRECT POSTAGE FOR BATCHES OF MAIL WITH PRESORT DISCOUNTS

(75) Inventor: Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 343 days.

(21) Appl. No.: 11/811,989

(22) Filed: Jun. 13, 2007

(65) Prior Publication Data

US 2008/0313104 A1 Dec. 18, 2008

(51) Int. Cl.
*G06F 17/00* (2006.01)
*G07B 17/02* (2006.01)

(52) U.S. Cl. ....................... 705/402; 705/401; 270/1.02

(58) Field of Classification Search ................. 705/402, 705/401; 270/1.02
See application file for complete search history.

(56) References Cited

U.S. PATENT DOCUMENTS 6,516,302 B1 * 2/2003 Deaton et al. ................. 705/14
2006/0108266 A1 * 5/2006 Bowers et al. .............. 209/584

OTHER PUBLICATIONS

Archive of "Why Presorting Makes Sense" www.dmeny.org/me/page.do?sitePageId=27321, [online] [Archived by http://archive.org on Sep. 28, 2006; retreived Jun. 15, 2009].*

* cited by examiner

*Primary Examiner*—John W Hayes
*Assistant Examiner*—Michael Harrington
(74) *Attorney, Agent, or Firm*—Brian A. Lemm; Angelo N. Chaclas

(57) ABSTRACT

A method and system of providing postage wherein delivery fee discounts are provided based on one or more sorting levels in which mail pieces are run through the system twice. In the first run, postal codes are obtained from the mail pieces, a running tally for each participating sorting level code in each sorting level is kept, and for each code in the highest sorting level that has a tally that reaches a predetermined minimum, an indicium reflecting the highest discount is printed on: (i) the mail piece whose postal code caused the tally to reach the minimum, and (ii) any mail pieces to that postal code that are processed thereafter. In the second run, for each mail piece not having a printed indicium, an indicium is printed which reflects a proper sorting level discount, if any, based on the postal code obtained therefrom and one or more of the tallies.

15 Claims, 4 Drawing Sheets

SYSTEM AND METHOD FOR PRINTING CORRECT POSTAGE FOR BATCHES OF MAIL WITH PRESORT DISCOUNTS

FIELD OF THE INVENTION

The invention disclosed herein relates generally to mail processing systems, and more particularly to a system and method for automatically printing correct postage for batches of mail that are eligible for presort discounts.

BACKGROUND OF THE INVENTION

Mail processing systems, such as, for example, a mailing machine, often include different modules that automate the processes of producing mail pieces. The typical mailing machine includes a variety of different modules or sub-systems each of which performs a different task on the mail piece. The mail piece is conveyed downstream utilizing a transport mechanism, such as rollers or a belt, to each of the modules. Such modules could include, for example, a singulating module for separating a stack of mail pieces such that the mail pieces are conveyed one at a time along the transport path, a stripping/moistening module for stripping open the flap of an envelope and wetting and sealing the glued flap of an envelope, a weighing module for weighing the mail piece, and a metering/printing module for computing postage amounts and applying evidence of postage either directly to the mail piece or to a label to be applied to the mail piece. The mailing machine is controlled by a central processing unit that executes software stored in memory provided in the mailing machine. The exact configuration of the mailing machine is, of course, particular to the needs of the user.

The proper postage amount for delivery of mail pieces is dependent upon characteristics of each mail piece (e.g., weight, dimensions) and may also be dependent upon the properties of a batch of mail pieces to which each mail piece belongs. For example, delivery fee discounts are available for batches of mail pieces that meet certain predetermined criteria, e.g., mail that is presorted based on three or five digits of the postal code of the destination address of the mail piece. Typically, for such discounts to apply, a minimum number of mail pieces must meet the special criteria established by the carrier (sometimes referred to as presort criteria or qualification). Usually, presort criteria are classified into several categories. For example, a simple presort criterion would require mail to be sorted into fairly large chunks associated with large processing facilities making up the carrier's network. An example of such a category is presort to three digit level postal codes or zip codes in the United States. Other presort criterion may require grouping mail pieces into classes associated with smaller facilities such as delivery post offices or certain compact geographical areas such as a given street or block.

If mail pieces are already presorted before they are processed in a mail processing system, such as a mailing machine, to apply postage thereto, the applicable discounts are already known and can therefore be applied during the mail processing (finishing). If, however, the mail is not presorted before processing, the applicability of any presort discounts that are available will not be known prior to processing. In such cases, the mail batch must either be presorted prior to processing, such that the appropriate discount, if any, can be applied during processing, or be processed using an expected discount, with verification and confirmation being made after the batch of mail has been processed to confirm that the expected discount was appropriate. Any mail pieces that are determined to not qualify for the presort discount that was applied (referred to as short paid or residual mail) must then have the postage thereon corrected to apply the proper rate.

For large mailers that typically have batches of mail in the thousands or tens of thousands of mail pieces, such presorting is typically done automatically when the batches of mail are generated using mail creation equipment (e.g., inserters, address printers, etc.). For smaller mailers that may not have very large batches of mail to process, e.g., batches that consist of hundreds of pieces or less, such presorting before processing or confirmation after processing must typically be done by hand, which is time consuming. In addition, corrected mail pieces (i.e., residual mail that has had additional postage applied thereto) require additional processing by the carrier, which may include reading more than one indicia or a certification mark to confirm that the proper amount of postage has actually been paid by the sender.

It would thus be advantageous to be able to automatically process batches of mail pieces using a mail processing system wherein any applicable presort discounts are determined automatically and proper indicia (based upon a discount if applicable) are applied to each mail piece.

SUMMARY OF THE INVENTION

In one embodiment, the invention specifies a method of providing postage for a batch of mail pieces using a mail processing system wherein presort discounts are provided based on one or more sorting levels. The sorting levels are based on destination postal codes, and each sorting level has a plurality of particular sorting level codes and a sorting level discount associated therewith. A highest one of the sorting level discounts is associated with a highest one of the sorting levels. The method includes two runs through the mail processing system. In particular, the method includes processing each of the mail pieces through the mail processing system in a first run, wherein during the first run the method includes obtaining a destination postal code from each of the mail pieces, keeping a running tally for each particular sorting level code in each sorting level, the running tally for each the particular sorting level code keeping track of the number of the mail pieces that correspond to that particular sorting level code based on the destination postal codes obtained from the mail pieces, and, for each particular sorting level code in the highest one of the sorting levels having a running tally that reaches a predetermined minimum, printing an indicium reflecting the highest one of the sorting level discounts on: (i) the one of the mail pieces whose destination postal code caused the running tally to reach the predetermined minimum, and (ii) any ones of the mail pieces that have a destination postal code that corresponds to that particular sorting level code that are processed through the mail processing system during the first run at a time subsequent to the running tally reaching the predetermined minimum. The method further includes processing each of the mail pieces not having an indicium printed thereon during the first run through the mail processing system in a second run, wherein during the second run the method includes obtaining a destination postal code from each of the mail pieces not having an indicium printed thereon during the first run, and, for each of the mail pieces not having an indicium printed thereon during the first run, printing an indicium thereon which reflects a proper one of the sorting level discounts, if any, based on the destination postal code obtained therefrom and one or more of the running tallies.

The sorting levels may include two sorting levels or three or more sorting levels. In one particular embodiment, the sorting levels include at least a three digit postal code level and a five digit postal code level. In such as case, the particular sorting level codes include particular five digit postal codes and particular three digit postal codes (i.e., the first three digits of a postal code).

The step of obtaining a destination postal code from each of the mail pieces may include reading a destination postal code from each of the mail pieces using OCR, and the step of obtaining a destination postal code from each of the mail pieces not having an indicium printed thereon during the first run may include reading a destination postal code from each of the mail pieces not having an indicium printed thereon during the first run using OCR. Furthermore, the step of, for each of the mail pieces not having an indicium printed thereon during the first run, printing an indicium thereon which reflects a proper one of the sorting level discounts, if any, based on the destination postal code obtained therefrom and one or more of the running tallies may include first determining whether the mail piece is eligible for the highest one of the sorting level discounts based on the running tally for the particular sorting level code in the highest one of the sorting levels that corresponds to the destination postal code obtained from the mail piece, and if the mail piece is not eligible for the highest one of the sorting level discounts, determining whether the mail piece is eligible for one of the sorting level discounts other than the highest one of the sorting level discounts based on the running tally for the particular sorting level code in one or more of the sorting levels other than the highest one of the sorting levels that corresponds to the destination postal code obtained from the mail piece. The step of determining whether the mail piece is eligible for the highest one of the sorting level discounts based on the running tally for the particular sorting level code in the highest one of the sorting levels that corresponds to the destination postal code obtained from the mail piece may include determining whether the running tally for the particular sorting level code in the highest one of the sorting levels that corresponds to the destination postal code obtained from the mail piece is greater than or equal to the predetermined minimum. Also, the step of determining whether the mail piece is eligible for one of the sorting level discounts other than the highest one of the sorting level discounts based on the running tally for the particular sorting level code in one or more of the sorting levels other than the highest one of the sorting levels that corresponds to the destination postal code obtained from the mail piece may include determining whether the running tally for the particular sorting level code in one or more of the sorting levels other than the highest one of the sorting levels that corresponds to the destination postal code obtained from the mail piece is greater than or equal to a corresponding predetermined minimum.

In another embodiment, the invention provides a computer readable medium having computer executable instructions for performing the method recited above.

In still another embodiment, the invention provides a mail processing system for providing postage for a batch of mail pieces that includes a metering/printing module, a central processing unit controlling operation of the metering/printing module, and a memory storing software executable by the central processing unit. The software includes instructions for performing the various method embodiments recited above.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
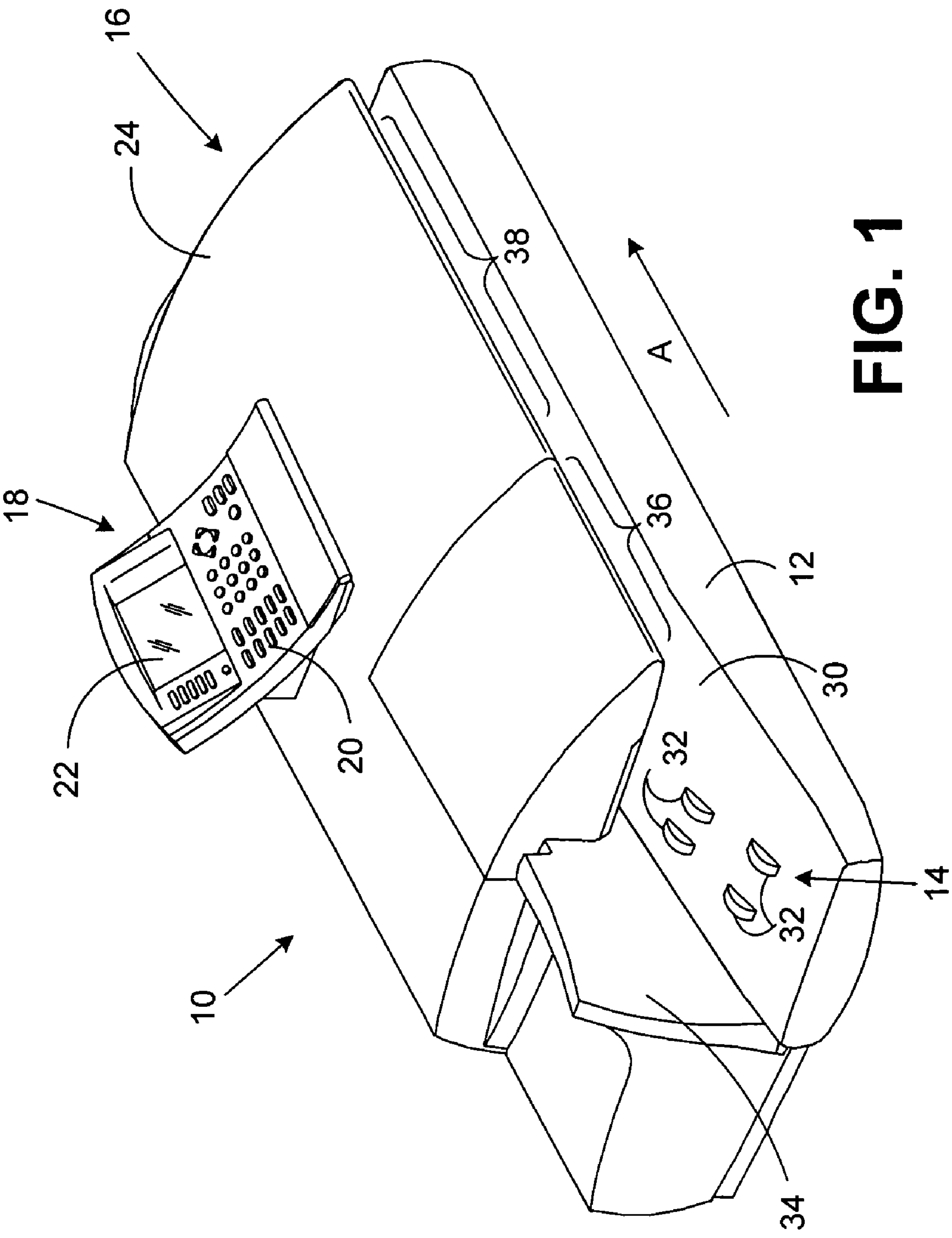
FIG. 1 is an isometric view of a mail processing system according to an embodiment of the present invention.

Referring to FIG. 1, an isometric view of a mail processing system 10, such as, without limitation, a mailing machine, according to an embodiment of the present invention is shown. Mailing processing system 10 comprises a base unit, designated generally by the reference numeral 12, the base unit 12 having a mail piece input end, designated generally by the reference numeral 14, and a mail piece output end, designated generally by the reference numeral 16. A UIC 18 is mounted on the base unit 12, and includes one or more input/output devices, such as, for example, a keyboard 20 and a display device 22. One or more cover members 24 are pivotally mounted on the base 12 so as to move from the closed position shown in FIG. 1 to an open position (not shown) so as to expose various operating components and parts for service and/or repair as needed.

The base unit 12 further includes a horizontal feed deck 30 that extends substantially from the input end 14 to the output end 16. A plurality of nudger rollers 32 are suitably mounted under the feed deck 30 and project upwardly through openings in the feed deck 30 so that the periphery of the rollers 32 is slightly above the upper surface of the feed deck 30 and can exert a forward feeding force on a succession of mail pieces placed in the input end 14. A vertical wall 34 defines a mail piece stacking location from which the mail pieces are fed by the nudger rollers 32 along the feed deck 30 and into a transport system (not shown) that transports the mail pieces in a downstream path of travel, as indicated by arrow A, through one or more modules, such as, for example, a separator module, a moistening/sealing module, and a scanning module 48 (shown in FIG. 2). Each of these modules may be located generally in the area indicated by reference numeral 36. The mail pieces are then passed to a weighing module 42 (shown in FIG. 2) and a metering/printing module 44 (shown in FIG. 2) located generally in the area indicated by reference numeral 38, and exit the mailing processing system 10 at the output end 16.

Figure 2:
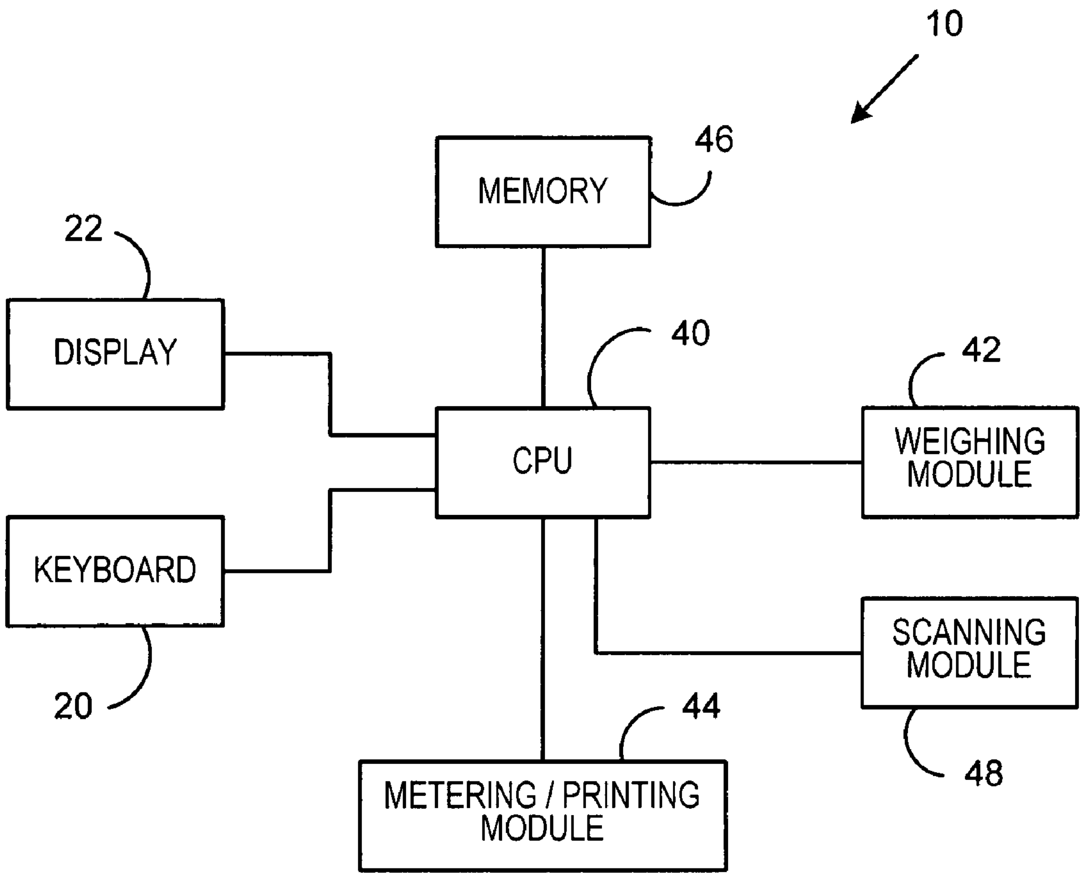
FIG. 2 is a block diagram of the mail processing system of FIG. 1.

FIG. 2 is a block diagram showing certain components of the mail processing system 10. As seen in FIG. 2, the mail processing system 10 includes a central processing unit (CPU) 40, a memory 46, a keyboard 20, a display device 22, a weighing module 42, a metering/printing module 44, and a scanning module 48. The display device 22 and the keyboard 20 provide a user interface to the CPU 40. The weighing module 42, such as a scale, weighs mail pieces and the metering/printing module 44, such as a postage meter, applies postage to the mail pieces and manages postage amounts stored therein. The scanning module 48 enables scanning and reading of destination postal codes from mail pieces using, for example, Optical Character Recognition (OCR) techniques. The CPU 40 controls all operations of the mail processing system 10 as described herein based on software stored in the memory 46, such as a non-volatile memory module. In addition, stored within the memory 46 are the standard rate tables published by the relevant postal authorities that specify the postage rates for all classes of mail including any presort discounts that may be available.

Figure 3:
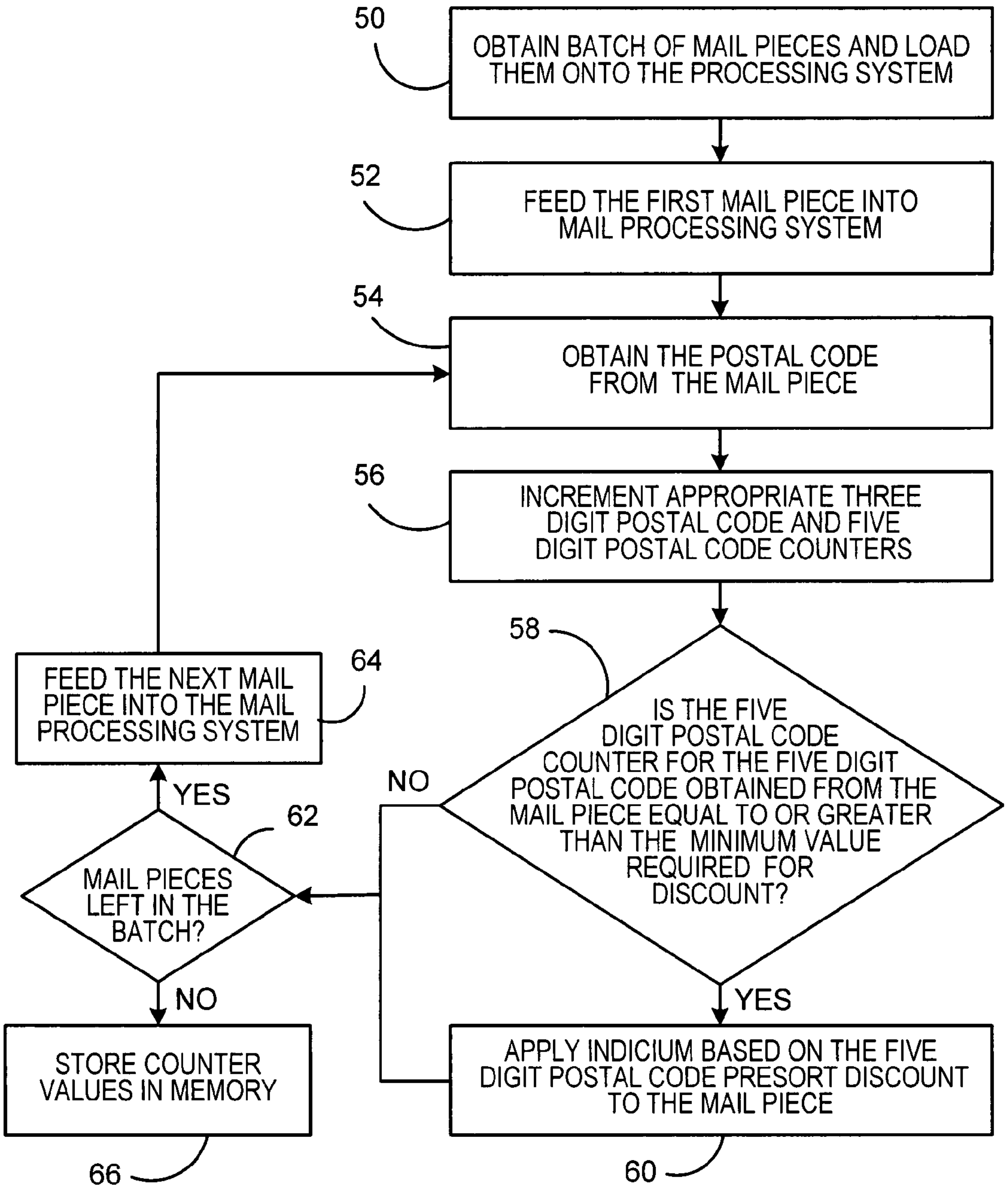
FIGS. 3 and 4 are flow diagrams illustrating the operation of the mail processing system according to an embodiment of the present invention.
Figure 4:
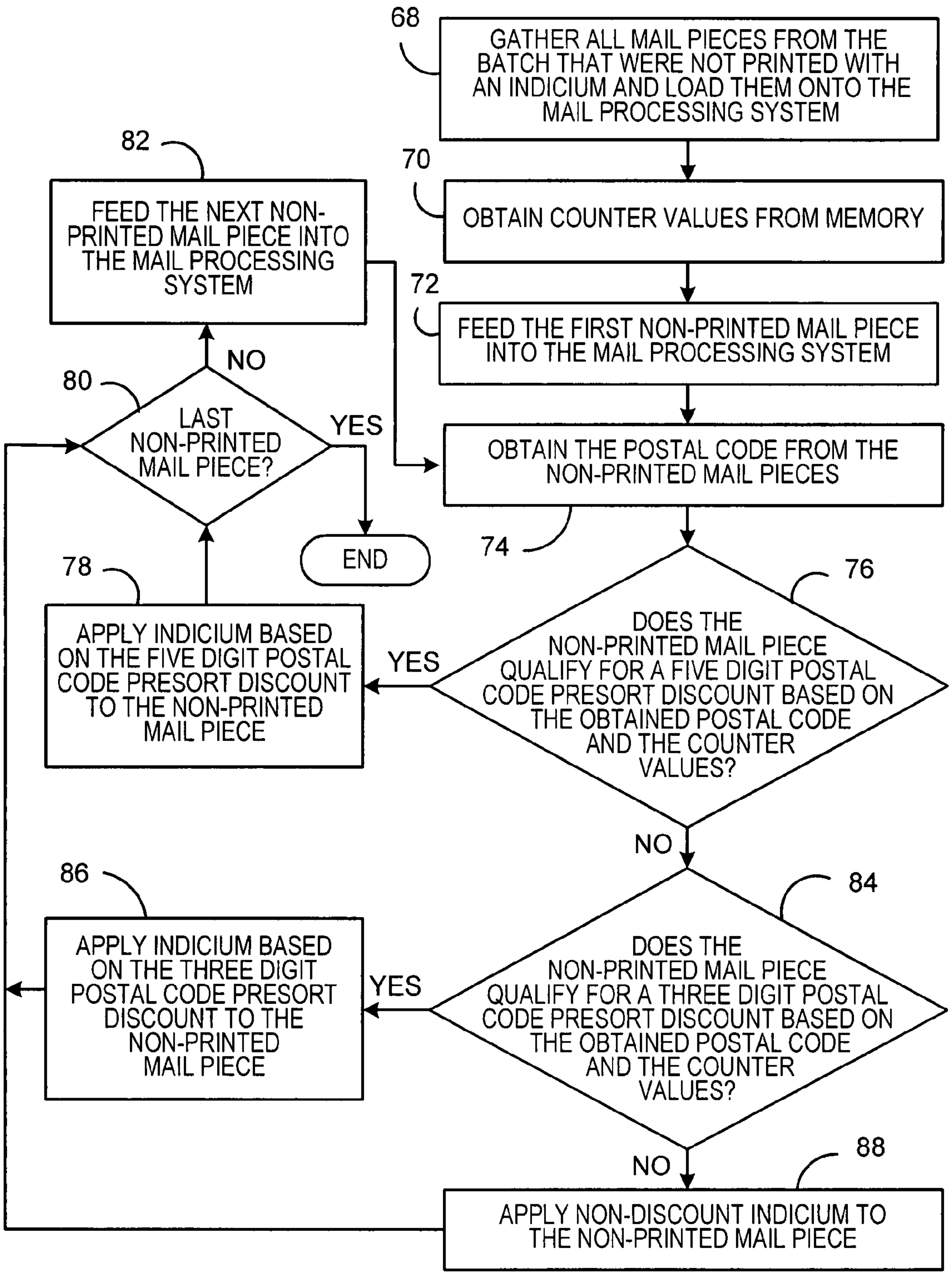

FIGS. 3 and 4 are flow diagrams illustrating the operation of the mail processing system 10 according to an embodiment of the present invention. According to the present invention, appropriate presort discounts are determined for a number of mail pieces in a batch of mail by processing the batch of mail using two runs through the mail processing system 10. In the methods of the present invention, presorting of the batch of mail is not required before the processing begins. The present invention can be utilized for any level of sorting based on destination information for a mail piece such as the destination postal code. For illustrative purposes, the invention will be described with respect to three and five digit postal code presorting. It should be understood, however, that the invention is not limited to that particular presorting criteria. In the illustrative embodiment, shown in FIGS. 3 and 4, to qualify for a first discount amount for presorting to a three digit postal code level (i.e., the first three digits of the postal code), there must be a minimum number of mail pieces in the batch of mail addressed for the same three digit postal code. For example, that minimum number of mail pieces may be two-hundred pieces. To qualify for a second discount amount greater than the first discount amount, there must be a minimum number of mail pieces in the batch of mail pieces addressed to the same five digit postal code. That minimum number is typically smaller than the minimum number for the three digit postal code discount and may be, for example, ten pieces.

The steps of the method shown in FIGS. 3 and 4 are implemented in software that is stored in the memory 46 and executed by the CPU 40 of the mail processing system 10. Referring to FIG. 3, the method begins at step 50, wherein the batch of mail pieces to be processed is obtained and loaded onto the mail processing system 10. Next, at step 52, the first mail piece in the batch is fed into the mail processing system 10. At step 54, the postal code from the mail piece is obtained using scanning module 48. Preferably, this is done by an automatic method such as reading the mail piece using optical character recognition (OCR) equipment and software provided as part of the mail processing system 10. According to an aspect of the present invention, the mail processing system 10 maintains a counter for each possible three digit postal code and each possible five digit postal code that may appear on a mail piece. Preferably, those counter values are maintained by the CPU 40 and stored in the memory 46. At step 56, the three digit postal code and five digit postal code counters corresponding to the postal code obtained in step 54 are incremented (as will be appreciated, they are initialized to a zero value). Next, at step 58, a determination is made as to whether the five digit postal code counter for the five digit postal code obtained from the mail piece is equal to or greater than a preset minimum value n required for a discount (which, in the example described above, is 10). If the answer at step 58 is no, then, at step 62, a determination is made as to whether there are any mail pieces left in the batch to be processed. If the answer at step 62 is yes, then, at step 64, the next mail piece from the batch is fed into the mail processing system and the method returns to step 54. If, however, the answer at step 62 is no, meaning that there are no additional mail pieces to be processed, then the method proceeds to step 66 wherein the counter values are stored in the memory 46 for subsequent use as described below in connection with FIG. 4. If, however, the answer at step 58 is yes, meaning that the five digit postal code counter for the five digit postal code obtained at step 54 has reached the required minimum value n, then, at step 60, an indicium is applied to the mail piece that includes sufficient postage for the mail piece and that is based on the five digit postal code presort discount. The method then proceeds to step 62, and processing continues as described above.

Thus, according to the method shown in FIG. 3, the mail processing system 10 does not, during the first run of the batch of mail through the mail processing system 10, generate or print any indicia on any of the mail pieces unless and until the minimum number of pieces n (e.g., 10) for a particular five digit postal code have been tallied. When one mail piece less than that minimum number n has been processed (i.e., the counter for that five digit postal code has a value equal to that n−1), than an indicium based on the appropriate five digit postal code discount will be generated and applied to any mail pieces in the batch that are subsequently processed (in the example, this will be for the tenth such mail piece and above) that are addressed to that five digit destination postal code. The processing in this manner continues until the entire batch of mail has completed the first run through the mail processing system 10. When the first run through the mail processing system 10 is complete, the mail processing system 10, and in particular the memory 46, will have an accurate count of the number of mail pieces going to each particular five digit postal code and the number of mail pieces going to each particular three digit postal code (i.e., the first three digits) for all mail pieces in the batch. Furthermore, only those mail pieces that were processed subsequent to the nth (the ninth in the example being used) piece of mail having the same five digit destination postal code will be printed with an indicium according to the second (higher) discount, as the minimum number of pieces for that five digit destination postal code will have been met.

The pieces of mail in the batch that have not had an indicium printed thereon in the first run, i.e., in the example being followed herein the first nine pieces of any group having a five digit destination postal codes that exceed the ten piece minimum, and all pieces having five digit destination postal codes that did not exceed the ten piece minimum, are then processed through the mail processing system 10 a second time according to the method shown in FIG. 4 described below. Since the information regarding the number of mail pieces being sent to the same five digit postal codes and three digit postal codes for the entire batch is now known by the mail processing system 10, any applicable discounts for mail pieces in each category can be determined and the mail pieces rated accordingly. Specifically, and as described in greater detail below, the mail processing system 10 can determine, based on the destination postal code of each mail piece, whether the discount for five digit postal code presorting applies, whether the discount for a three digit postal code level presorting applies, or whether no discount is available.

Referring to FIG. 4, the method begins at step 68, wherein all of the mail pieces from the batch that were not printed with an indicium are gathered and loaded onto the mail processing system 10 for the second run. At step 70, the CPU 40 obtains the counter values that were stored in the memory 46 during the first run. Next, at step 72, the first non-printed mail piece is fed into the mail processing system 10. At step 74, the postal code from the non-printed mail piece is obtained, preferably as described elsewhere herein. Then, at step 76, a determination is made as to whether the non-printed mail piece qualifies for a five digit postal code presort discount based on the obtained postal code (step 74) and the stored counter values. In particular, at this step, the CPU 40 will determine whether the counter value for the particular five digit postal code in question has met or exceeded the minimum value n required for a discount, and if so, a discount will be awarded. If the answer at step 76 is yes, then, at step 78, an indicium having sufficient postage and based on the five digit postal code presort discount is applied to the non-printed mail piece. Then, at step 80, a determination is made as to whether that was the last non-printed mail piece (in other words, are there more non-printed mail pieces to be processed). If the answer at step 80 is yes, then the process ends. If, however, the answer at step 80 is no, then, at step 82, the next non-printed mail piece is fed into the mail processing system 10 and processing continues as described.

If, however, the answer at step 76 is no, meaning that a five digit postal code presort discount is not available, then, at step 84, a determination is made as to whether the non-printed mail piece qualifies for a three digit postal code presort discount based on the obtained postal code and the counter values. In particular, at this step, the CPU 40 will determine whether the counter value for the particular three digit postal code in question has met or exceeded the minimum value n required for a discount, and if so, a discount will be awarded. If the answer at step 84 is yes, then, at step 86, an indicium having sufficient postage based on the three digit postal code presort discount is applied to the non-printed mail piece, and the method proceeds to step 80 for processing as described above. If, however, the answer at step 84 is no, meaning that the non-printed mail piece is not eligible for a three digit postal code presort discount, then, at step 88, a non-discounted indicium is applied to the non-printed mail piece. Thereafter, the method proceeds to step 80 for processing as described elsewhere herein.

In short, during the second run, those mail pieces having a postal code that qualifies for the discount based on the five digit postal code level presort, i.e., the first nine mail pieces in each five digit postal code category that qualified for the second discount in the example being followed herein, an indicium will be generated and printed that reflects the appropriate discount. For those mail pieces that do not qualify for the five digit postal code presort discount (the minimum piece count was not reached) but do qualify for the discount based on the three digit postal code presort level (the minimum number pieces was reached for that three digit postal code presort level), an indicium will be generated and printed on the mail piece that reflects only the discount based on the three digit postal code. For those mail pieces that do not qualify for either the first or second discount, an indicium will be generated and printed that reflects no discount.

Thus, at the end of the second run of the batch of mail through the mail processing system 10, every mail piece in the batch will have an indicium printed thereon that reflects the proper postage amount, including any presort discounts that apply. By utilizing the present invention, there is no longer any need to sort in advance a batch of mail to determine which discounts, if any, will apply to mail pieces in the batch, nor is it necessary to perform a confirmation of the discounts following processing, as the proper discount will have been applied.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of providing postage for a batch of mail pieces using a mail processing system wherein delivery fee discounts are provided based on one or more sorting levels based on destination postal codes, wherein each sorting level has a plurality of particular sorting level codes, wherein each sorting level has a sorting level discount associated therewith, and wherein a highest one of said sorting level discounts is associated with a highest one of said sorting levels, the method comprising:

processing each of said mail pieces through said mail processing system in a first run, wherein during said first run said method includes:

obtaining a destination postal code from each of said mail pieces;

keeping a running tally for each particular sorting level code in each sorting level, said running tally for each said particular sorting level code keeping track of the number of said mail pieces that correspond to that particular sorting level code based on the destination postal codes obtained from the mail pieces; and for each particular sorting level code in said highest one of said sorting levels having a running tally that reaches a predetermined minimum, printing an indicium reflecting said highest one of said sorting level discounts on: (i) the one of said mail pieces whose destination postal code caused the running tally to reach the predetermined minimum, and (ii) any ones of said mail pieces that have a destination postal code that corresponds to that particular sorting level code that are processed through said mail processing system during said first run at a time subsequent to the running tally reaching said predetermined minimum; and processing each of said mail pieces not having an indicium printed thereon during said first run through said mail processing system in a second run, wherein during said second run said method includes:

obtaining a destination postal code from each of said mail pieces not having an indicium printed thereon during said first run; and for each of said mail pieces not having an indicium printed thereon during said first run, printing an indicium thereon which reflects a proper one of said sorting level discounts, if any, based on the destination postal code obtained therefrom and one or more of said running tallies.

2. The method according to claim 1, wherein said one or more sorting levels include at least a three digit postal code level and a five digit postal code level.

3. The method according to claim 2, wherein said five digit postal code level is said highest one of said sorting levels.

4. The method according to claim 1, wherein said one or more sorting levels consist of two sorting levels.

5. The method according to claim 1, wherein said one or more sorting levels consist of three or more sorting levels.

6. The method according to claim 1, wherein obtaining a destination postal code from each of said mail pieces comprises reading a destination postal code from each of said mail pieces.

7. The method according to claim 1, wherein for each of said mail pieces not having an indicium printed thereon during said first run, printing an indicium thereon which reflects a proper one of said sorting level discounts, if any, based on the destination postal code obtained therefrom and one or more of said running tallies comprises first determining whether the mail piece is eligible for said highest one of said sorting level discounts based on the running tally for the particular sorting level code in said highest one of said sorting levels that corresponds to the destination postal code obtained from the mail piece, and if the mail piece is not eligible for said highest one of said sorting level discounts, determining whether the mail piece is eligible for one of said sorting level discounts other than said highest one of said sorting level discounts based on the running tally for the particular sorting level code in one or more of the sorting levels other than said highest one of said sorting levels that corresponds to the destination postal code obtained from the mail piece.

8. The method according to claim 7, wherein determining whether the mail piece is eligible for said highest one of said sorting level discounts based on the running tally for the particular sorting level code in said highest one of said sorting levels that corresponds to the destination postal code obtained from the mail piece includes determining whether the running tally for the particular sorting level code in said highest one of said sorting levels that corresponds to the destination postal code obtained from the mail piece is greater than or equal to said predetermined minimum.

9. The method according to claim 8, wherein determining whether the mail piece is eligible for one of said sorting level discounts other than said highest one of said sorting level discounts based on the running tally for the particular sorting level code in one or more of the sorting levels other than said highest one of said sorting levels that corresponds to the destination postal code obtained from the mail piece includes determining whether the running tally for the particular sorting level code in one or more of the sorting levels other than said highest one of said sorting levels that corresponds to the destination postal code obtained from the mail piece is greater than or equal to a corresponding predetermined minimum.

10. A mail processing system for providing postage for a batch of mail pieces wherein delivery fee discounts are provided based on one or more sorting levels based on destination postal codes, wherein each sorting level has a plurality of particular sorting level codes, wherein each sorting level has a sorting level discount associated therewith, and wherein a highest one of said sorting level discounts is associated with a highest one of said sorting levels, the mail processing system comprising:

a printing module;

a central processing unit controlling operation of said printing module; and a memory storing software executable by said central processing unit, said software including instructions for:

(i) in a first run of said mail pieces through said mail processing system:

obtaining a destination postal code from each of said mail pieces;

keeping a running tally for each particular sorting level code in each sorting level, said running tally for each said particular sorting level code keeping track of the number of said mail pieces that correspond to that particular sorting level code based on the destination postal codes obtained from the mail pieces; and for each particular sorting level code in said highest one of said sorting levels having a running tally that reaches a predetermined minimum, causing said printing module to print an indicium reflecting said highest one of said sorting level discounts on: (i) the one of said mail pieces whose destination postal code caused the running tally to reach the predetermined minimum, and (ii) any ones of said mail pieces that have a destination postal code that corresponds to that particular sorting level code that are processed through said mail processing system during said first run at a time subsequent to the running tally reaching said predetermined minimum; and (ii) in a second run of each of said mail pieces not having an indicium printed thereon during said first run through said mail processing system:

obtaining a destination postal code from each of said mail pieces not having an indicium printed thereon during said first run; and for each of said mail pieces not having an indicium printed thereon during said first run, causing said printing module to print an indicium thereon which reflects a proper one of said sorting level discounts, if any, based on the destination postal code obtained therefrom and one or more of said running tallies.

11. The mail processing system according to claim 10, wherein said instructions for obtaining a destination postal code from each of said mail pieces comprise instructions for reading a destination postal code from each of said mail pieces.

12. The mail processing system according to claim 10, wherein said instructions for, for each of said mail pieces not having an indicium printed thereon during said first run, causing said printing module to print an indicium thereon which reflects a proper one of said sorting level discounts, if any, based on the destination postal code obtained therefrom and one or more of said running tallies compromise instructions for first determining whether the mail piece is eligible for said highest one of said sorting level discounts based on the running tally for the particular sorting level code in said highest one of said sorting levels that corresponds to the destination postal code obtained from the mail piece, and if the mail piece is not eligible for said highest one of said sorting level discounts, determining whether the mail piece is eligible for one of said sorting level discounts other than said highest one of said sorting level discounts based on the running tally for the particular sorting level code in one or more of the sorting levels other than said highest one of said sorting levels that corresponds to the destination postal code obtained from the mail piece.

13. The mail processing system according to claim 12, wherein said instructions for determining whether the mail piece is eligible for said highest one of said sorting level discounts based on the running tally for the particular sorting level code in said highest one of said sorting levels that corresponds to the destination postal code obtained from the mail piece include instructions for determining whether the running tally for the particular sorting level code in said highest one of said sorting levels that corresponds to the destination postal code obtained from the mail piece is greater than or equal to said predetermined minimum.

14. The mail processing system according to claim 13, wherein said instructions for determining whether the mail piece is eligible for one of said sorting level discounts other than said highest one of said sorting level discounts based on the running tally for the particular sorting level code in one or more of the sorting levels other than said highest one of said sorting levels that corresponds to the destination postal code obtained from the mail piece include instructions for determining whether the running tally for the particular sorting level code in one or more of the sorting levels other than said highest one of said sorting levels that corresponds to the destination postal code obtained from the mail piece is greater than or equal to a corresponding predetermined minimum.

15. The mail processing system according to claim 10, wherein said mail processing system is mailing machine.

* * * * *